(12) United States Patent
Katz et al.

(10) Patent No.: US 7,577,132 B2
(45) Date of Patent: Aug. 18, 2009

(54) USER INTERFACE FOR SECURING LIGHTWEIGHT DIRECTORY ACCESS PROTOCOL TRAFFIC

(75) Inventors: Ariel Katz, Haifa (IL); Ron Mondri, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 503 days.

(21) Appl. No.: 10/997,433

(22) Filed: Nov. 24, 2004

(65) Prior Publication Data

US 2006/0168255 A1 Jul. 27, 2006

Related U.S. Application Data

(63) Continuation of application No. 10/975,292, filed on Oct. 28, 2004.

(51) Int. Cl.
*H04L 12/66* (2006.01)
(52) U.S. Cl. .................. 370/352; 370/401; 709/203; 709/219; 709/220
(58) Field of Classification Search .............. 370/352, 370/401; 709/203, 219, 220
See application file for complete search history.

(56) References Cited

U.S. PATENT DOCUMENTS

| | | | |
|---|---|---|---|
| 6,154,776 A * | 11/2000 | Martin .................. | 709/226 |
| 6,622,170 B1 * | 9/2003 | Harrison et al. ........ | 709/221 |
| 6,665,674 B1 | 12/2003 | Buchanan et al. | |
| 6,680,942 B2 * | 1/2004 | Mead et al. ............. | 370/392 |
| 6,701,374 B2 | 3/2004 | Gupta et al. | |
| 6,732,105 B1 | 5/2004 | Watson, Jr. et al. | |
| 6,799,197 B1 * | 9/2004 | Shetty et al. ........... | 709/203 |
| 7,002,973 B2 * | 2/2006 | McLampy et al. ...... | 370/401 |
| 7,184,999 B1 | 2/2007 | Watson, Jr. et al. | |
| 2001/0042104 A1 * | 11/2001 | Donoho et al. ......... | 709/207 |
| 2002/0124057 A1 | 9/2002 | Besprosvan | |
| 2003/0191757 A1 | 10/2003 | Ambrosini et al. | |
| 2003/0200332 A1 | 10/2003 | Gupta et al. | |
| 2004/0059719 A1 | 3/2004 | Gupta et al. | |
| 2004/0167859 A1 | 8/2004 | Mirabella | |
| 2004/0177152 A1 | 9/2004 | Aviran | |
| 2004/0215775 A1 | 10/2004 | Murray, Jr. et al. | |
| 2005/0005107 A1 | 1/2005 | Touboul | |
| 2005/0071643 A1 | 3/2005 | Moghe | |
| 2005/0091343 A1 | 4/2005 | Murray, Jr. | |

(Continued)

FOREIGN PATENT DOCUMENTS

EP 1113648 7/2001

OTHER PUBLICATIONS

Octetstring, Inc.: "Directory Federator Express," 'Online! 2003, pp. 1-10, XP002364765 available at <<http://octetstring.com/pdf/DFE-Whiter-paper.pdf>>, retrieved on Jan. 26, 2006, pp.

(Continued)

*Primary Examiner*—William Trost, IV
*Assistant Examiner*—Roberta A Shand
(74) *Attorney, Agent, or Firm*—Lee & Hayes, PLLC

(57) ABSTRACT

Lightweight directory access protocol (LDAP) management is described. In an implementation, a method includes exposing a user interface suitable for receiving inputs from a user that specify whether execution of a particular lightweight directory access protocol (LDAP) action is permitted. A policy is configured based on the inputs, for managing lightweight directory access protocol (LDAP) traffic on a network.

29 Claims, 16 Drawing Sheets

U.S. PATENT DOCUMENTS

2005/0102297 A1    5/2005    Lloyd et al.

OTHER PUBLICATIONS

Raithel, et al., "Gauntlet for IRIX Adminstrator's Guide Version 4.1," 'Online! 1999, XP002364766 available at <<http://techpubs.sgi.com/library/manuals/2000/007-2826-005.pdf>>, retrieved on Jan. 26, 2006, pp. 95-99.

Symlabs: "Symlabs Directory Extender, Document Version 2.0," Technical White Paper, 'Online! May 2004, XP002364764, available at <<http://www.symlabs.com/Products/DirextWP_A4.pdf>>, 'retrieved on Jan. 26, 2006, pp. 1-15.

"Innosoft-Directory Solutions-LDAP World-Welcome" Innosoft International Inc. website: http://www.innosoft.com/ldapworld/ printed Oct. 18, 2004 2 pages.

"Introduction to LDAP" LDAP Project Version 0.1 website: http://ldap-project.berkeley.edu/reports/introduction/LDAPintro-longer.html printed Oct. 12, 2004 4 pages.

"Secure Directory Solutions" Nexorplore A Nexor White Paper www.nexor.com Nov. 2002 10 pages.

"Virtual Directory Engine" Octet String website: http://www.octetstring.com/products/VDE.php printed on Oct. 18, 2004 4 pages.

Donnelly M.,"An Introduction to LDAP" website: http://ldapman.org/articles/intro_to_ldap.html printed Oct. 18, 2004 9 pages.

Reed Archie, "Control Directory Services with LDAP Proxy" WindowsITPro website: http://www.winntmag.com/Articles/Index.cfm?ArticleID7281 printed Oct. 18, 2004 4 pages.

"NetProwler 3.0 Security Update 11", retrieved on Feb. 4, 2009 at <<http://securityresponse.symatec.com/avcenter/security/Content/2000_04_26.html>>, Symantec, Apr. 26, 2000, pp. 1-3.

* cited by examiner

1400

1500 ⟶

1600

1700

USER INTERFACE FOR SECURING LIGHTWEIGHT DIRECTORY ACCESS PROTOCOL TRAFFIC

RELATED APPLICATIONS

The present application claims priority under 35 U.S.C. §120 as a continuation of U.S. patent application Ser. No. 10/975,292, filed Oct. 28, 2004, to Katz et al., and titled "Securing Lightweight Directory Access Protocol Traffic", the disclosure of which is hereby incorporated by reference in its entirety.

TECHNICAL FIELD

The present invention generally relates to the field of data management and more particularly relates to securing lightweight directory access protocol traffic.

BACKGROUND

A Lightweight Directory Access Protocol (which may also be referenced by the acronym "LDAP"), is an Internet protocol that application modules (e.g., operating system components, stand-alone applications, and so on) may utilize to access a wide variety of data. For example, an application module may access contact information from an LDAP server. The LDAP server allows directory-like information to be stored, searched, displayed, and updated. For instance, the LDAP server may be deployed as a central directory for an organization or an organizational unit. Additionally, the LDAP server may be used for the management of user and computer account identities and as such may be deployed for use in user authentication.

In some implementations, however, the LDAP server may include data that is not protected from potentially untrustworthy clients, thereby resulting in possible exposure of the LDAP server and the data accessible thereon to attacks from malicious parties. For example the LDAP server may be configured to include a company's internal information in an LDAP directory, which may contain sensitive data such as user account information, the company's server locations, and so on. Accordingly, clients located inside the company's environment (e.g., via a company intranet) may access the LDAP directories to obtain desired data, such as for server management and user authentication. Client's located "outside" this environment (e.g., via the Internet), however, may also desire access to this data, such as to access user accounts for "e-commerce" purposes. Therefore, even though the LDAP servers may be located "inside" a corporate intranet, these LDAP directories may still be exposed to clients outside the corporate intranet, which may result in a corresponding exposure to hacker attacks that attempt to obtain this data.

Therefore, there is a continuing need for techniques that may be employed to secure traffic that utilizes the lightweight directory access protocol.

SUMMARY

A lightweight directory access protocol filter module (LDAP filter module) is described which is executable to secure traffic configured according to the lightweight directory access protocol. For example, the LDAP filter module may be disposed between an LDAP directory which organizes data according to the lightweight directory access protocol and applications which request access to the LDAP directory. The LDAP filter module, when executed, may intercept and parse requests and/or responses to the requests to enforce one or more policies, such as to limit LDAP actions that may be performed with respect to the LDAP directory. For example, the policy may specify that a particular LDAP operation is not to be performed (e.g., "modify"), that a particular LDAP operation is not to be performed on a particular LDAP object (e.g., "delete user_name"), that a particular LDAP object is not to be accessed by unauthorized users (e.g., "password"), and so on. Thus, the LDAP filter module may manage traffic between the LDAP directory and the applications.

A user interface may also be provided for configuring a policy that is implemented by the LDAP filter module. For example, the user interface may provide a plurality of descriptions of LDAP actions. A user interacts with the user interface to select one or more of the descriptions to indicate whether the described LDAP action is or is not to be performed. This interaction may be utilized to configure a policy accordingly that may be implemented by the LDAP filter module to manage traffic.

BRIEF DESCRIPTION OF THE DRAWINGS

The same reference numbers are utilized in instances in the discussion to reference like structures and components.

DETAILED DESCRIPTION

Figure 1:
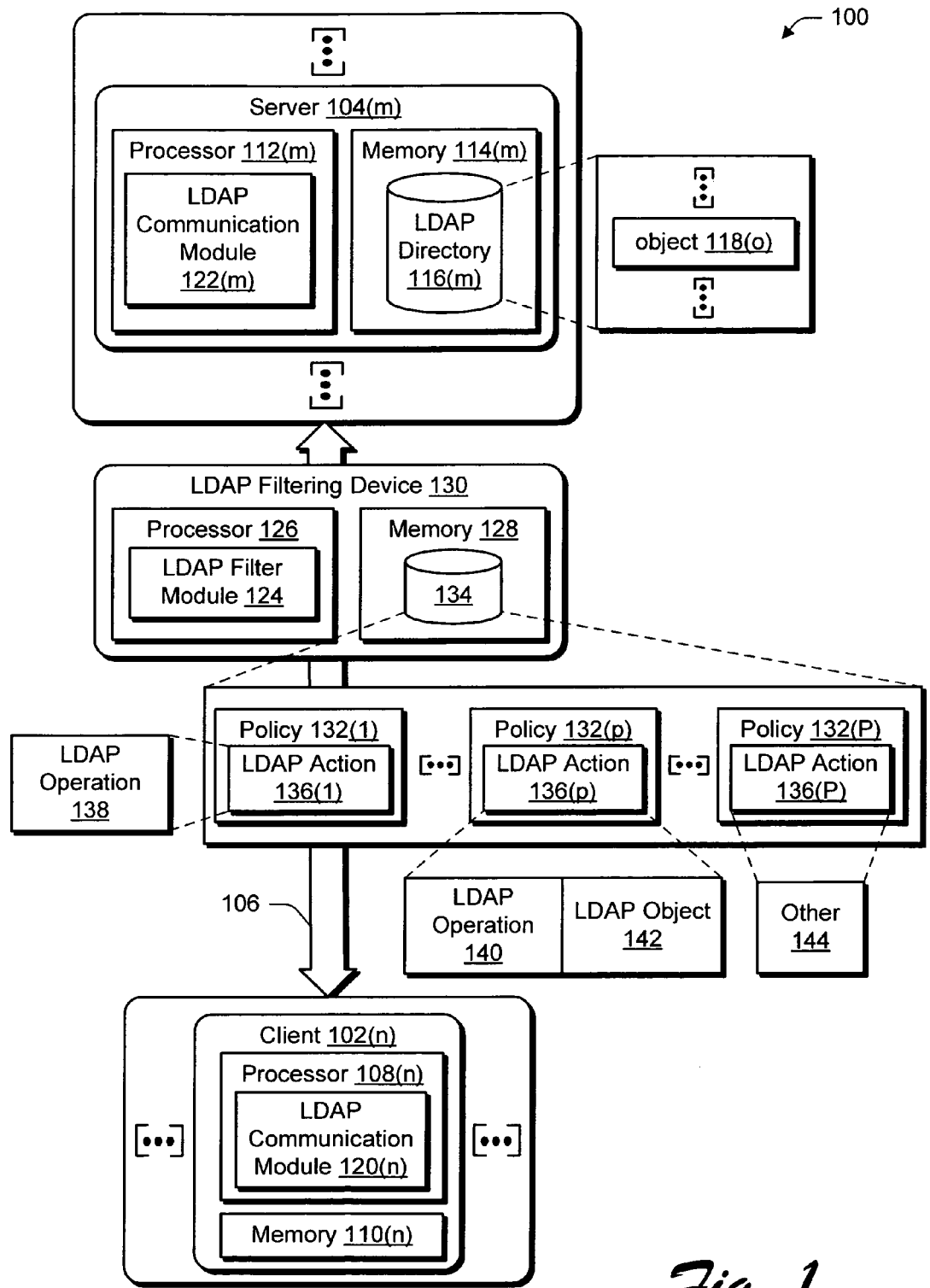
FIG. 1 is an illustration of an environment in an exemplary implementation in which lightweight directory access protocol traffic may be communicated.

FIG. 1 is an illustration of an environment 100 in an exemplary implementation in which lightweight directory access protocol traffic may be communicated. The illustrated environment 100 depicts a plurality of clients 102(n), where "n" can be any integer from one to "N". The plurality of clients 102(n) are illustrated as communicatively coupled to a plurality of servers 104(m), where "m" can be any integer from one to "M", over a network 106. Each of the plurality of clients 102(n) and servers 104(m) may be configured in a variety of ways. For example, one or more of the clients 102(n) may be configured as a computing device that is capable of communicating over the network 106, such as a desktop computer, a mobile station, an entertainment appliance, a set-top box communicatively coupled to a display device, a game console, a wireless phone, and so forth. The clients 102(n) may range from full resource devices with substantial memory and processor resources (e.g., personal computers, game consoles, and so on) to low-resource devices with limited memory and/or processing resources (e.g., traditional set-top boxes). For purposes of the following discussion, the clients 102(n) may also relate to a person and/or entity that operate the respective client. In other words, client 102(n) may describe a logical client that includes a user and/or a machine.

Likewise, the plurality of servers 104(m) may also be configured in a variety of ways, range from full resource devices to low-resource devices, and so on. Accordingly, the terminology "server" and "client" does not necessarily represent respective amounts of memory and processor resources provided by the respective servers and clients. For instance, one or more of the clients 102(n) may be configured to include substantial processor and memory resources while one or more of the servers 104(m) may be configured to include limited processor and memory resources.

The client 102(n) is illustrated as having a respective processor 108(n) and memory 110(n). Likewise, the server 104(m) is also illustrated as having a respective processor 112(m) and memory 114(m). Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 110(n), 114(m) is shown for each of the respective clients 102(n) and servers 104(m), memory 110(n), 114(m) may represent a wide variety of types and combinations of memory devices, such as random access memory (RAM), hard disk memory, removable medium memory, and so forth.

The network 106 is configured to provide for communication of data according to a directory access protocol, such as a Lightweight Directory Access Protocol (LDAP). LDAP is a message-oriented directory access protocol which enables the clients 102(n) and servers 104(m) to communicate, one to another, over the network 106. LDAP, for instance, may be configured to run over transmission control protocol/Internet protocol (TCP/IP) to allow the clients 102(n) to interact with an LDAP directory 116(m) that is available from the server 104(m). The LDAP directory 116(m) represents any directory which is accessible using LDAP, and therefore is not limited to any specific type of directory, such as a type of directory implemented by a particular software provider.

In an implementation, the LDAP directory 116(m) is organized according a hierarchical (i.e., "tree") structure. The hierarchy may be configured to reflect a wide variety of structures, such as a company's organization chart, geographic boundaries, and so on. For example, the LDAP directory 116(m) may include a plurality of objects 118(o), where "o" can be any integer from one to "O". Each of the objects 118(o) (i.e., entries) is a collection of one or more attributes that is specified by a name, which may be referred to as a distinguished name (DN) for that collection. The distinguished name is utilized to unambiguously refer to a corresponding object. In an implementation, each of the objects' 118(o) attributes has a type and one or more values. Types are commonly described via names or mnemonics, such as "cn" for common name, "mail" for email, and so on. The values may contain a wide variety of data that corresponds to the attribute. For instance, the "mail" attribute may include the value "test@test.com".

A variety of actions may be performed utilizing LDAP, which for purposes of the following discussion will be referred to as "LDAP actions". For example, the LDAP functional model supports a variety of LDAP operations, such as interrogation operations, update operations, and authentication and control operations. Examples of interrogation operations include "search" and "compare". A search operation, for instance, may be utilized to locate a single one of the plurality of objects 118(o), search for a plurality of objects located within a sub-tree in a hierarchical structure of the LDAP directory 116(m), and so on. A compare operation may be utilized to compare whether a particular object 118(o) includes a particular value.

Examples of update operations include "add", "delete", "modify", and "rename" (i.e., modify name). These operations provide the ability to add, delete, change, and rename the objects 118(o), respectively. Examples of authentication and control operations include "bind", "unbind", and "abandon". The bind operation, when performed, allows the client 102(n) to identify itself to the server 104(m), and more particular the LDAP directory 116(m), by communicating authentication information. Execution of the unbind operation allows the server 104(m) to discard the authentication information. The abandon operation provides the client 102(n) with the ability to indicate to the server 104(m) that a performance of a previously sent LDAP operation is no longer desirable. For example, the client 102(n) may initiate a search operation to locate a particular object 118(o), and then initiate an abandon operation to cause termination of the search operation by the server 104(m). Although nine LDAP operations have been described, additional LDAP operations are also within the spirit and scope of LDAP actions, such as LDAP extended operations, LDAP controls, and LDAP operations which provide simple authentication and security layer (SASL) support.

LDAP may be utilized to provide communication between varieties of different platforms, and therefore may be considered "platform independent". Accordingly, the features described herein are platform-independent, meaning that the strategies may be implemented on a variety of commercial computing platforms having a variety of processors. For example, the clients 102(n) and the server 104(m), as previously described, may be configured in a variety of ways and utilize LDAP to communicate, one to another. Therefore, an LDAP communication module 120(n) (which is illustrated as being executed on the processor 108(n) and is storable in memory 110(n) on the client 102(n)) may communicate with an LDAP communication module 122(m) (which is illustrated as being executed on the processor 112(m) and is storable in memory 114(m) on the server 104(m)) via the network 106 regardless of the respective configurations employed by the corresponding computing devices. The LDAP communication modules 120(*n*), 122(*m*) are representative of any module that may communicate data (e.g., messages) in accordance with the LDAP. For instance, LDAP communication module 120(*n*) may be implemented within an application that is executable by the client 102(*n*).

As previously described, communication utilizing LDAP may be performed utilizing messages. For example, the client 102(*n*) may execute the LDAP communication module 120(*n*) for forming a request that is communicated via the network 106 to the server 104(*m*). The server 104(*m*) may process the request by executing the LDAP communication module 122(*m*) to access the LDAP directory 116(*m*) to form one or more responses which are communicated back across the network 106 to the client 102(*n*). The responses, for instance, may include an answer (e.g., an email address) or a pointer which references a network location of where the answer may be found. Previously, however, access to the LDAP directory 116(*m*) was not secured. Consequently, access to the objects 118(*o*) in the LDAP directory 116(*m*) was not secured. Therefore, once the client 102(*n*) obtained access to the LDAP directory 116(*m*), the client 102(*n*) could access each of the objects 118(*o*), some of which may contain sensitive information, such as a user's credit card information, home address, passwords, and so on.

To manage the data trafficked between the clients 102(*n*) and the servers 104(*m*), and thereby prevent unauthorized access to the objects 118(*o*) in the LDAP directory 116(*m*), the environment 100 may employ an LDAP filter module 124. The LDAP filter module 124 is illustrated as being executed on a processor 126 and is storable in memory 128 of an LDAP filtering device 130, which in this instance is illustrated as communicatively coupled to the network 106 between the plurality of clients 102(*n*) and the plurality of servers 104(*m*). The LDAP filter module 124, when executed, manages the traffic according to one or more of a plurality of policies 132(1), . . . , 132(*p*), . . . , 132(P), which are illustrated as being stored in a database 134 in the memory 128 of the LDAP filtering device 130.

The plurality of policies 132(1)-132(P) may be configured in a variety of ways to describe permissible and impermissible actions that may be performed via the LDAP employed by the network 106. Each of the plurality of policies 132(1)-132(P) is illustrated in FIG. 1 as referencing a respective one of a plurality of LDAP actions 136(1), . . . , 136(*p*), . . . , 136(P). LDAP action 136(1), for instance, is illustrated as referencing whether a particular LDAP operation 138 is permitted to be performed. For example, the LDAP action 136(1) referenced by the policy 136(1) may indicate that "modify" LDAP operations are not permitted with respect to the LDAP directory 116(*m*). Thus, the policy 132(1), when referenced by the LDAP filter module 124, may be utilized to prevent performance of the "modify" LDAP operation on the LDAP directory 116(*m*).

In another instance, the policy 132(*p*) may reference an LDAP action 136(*p*) that includes both an LDAP operation 140 and a particular LDAP object 142. For example, rather than prevent the execution of all "modify" LDAP operations, the policy 132(*p*) may limit the ability to modify a particular object 118(*o*) (e.g., "user_logon_name") while allowing the modification of other objects (e.g., "user_Password"). A policy 132(P) can also describe "other" 144 types of LDAP actions 136(P), such as by only allowing locator pings from the clients 102(*n*) to locate one or more of the servers 104(*m*) when one or more of the clients 102(*n*) connect via the Internet.

The LDAP filter module 124, LDAP filtering device 130, the plurality of clients 102(*n*), and the plurality of servers 104(*m*) may be implemented in a wide variety of differing environments. For instance, the LDAP filter module 124 may be implemented as a network firewall device, (an example of which is shown in relation to FIG. 2), on a dedicated LDAP server, and so on.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, such as the memories 10(*n*), 114(*m*), 128. As previously described, the features of the LDAP management strategies described below are platform-independent, meaning that the strategies may be implemented on a variety of commercial computing platforms having a variety of processors.

Figure 2:
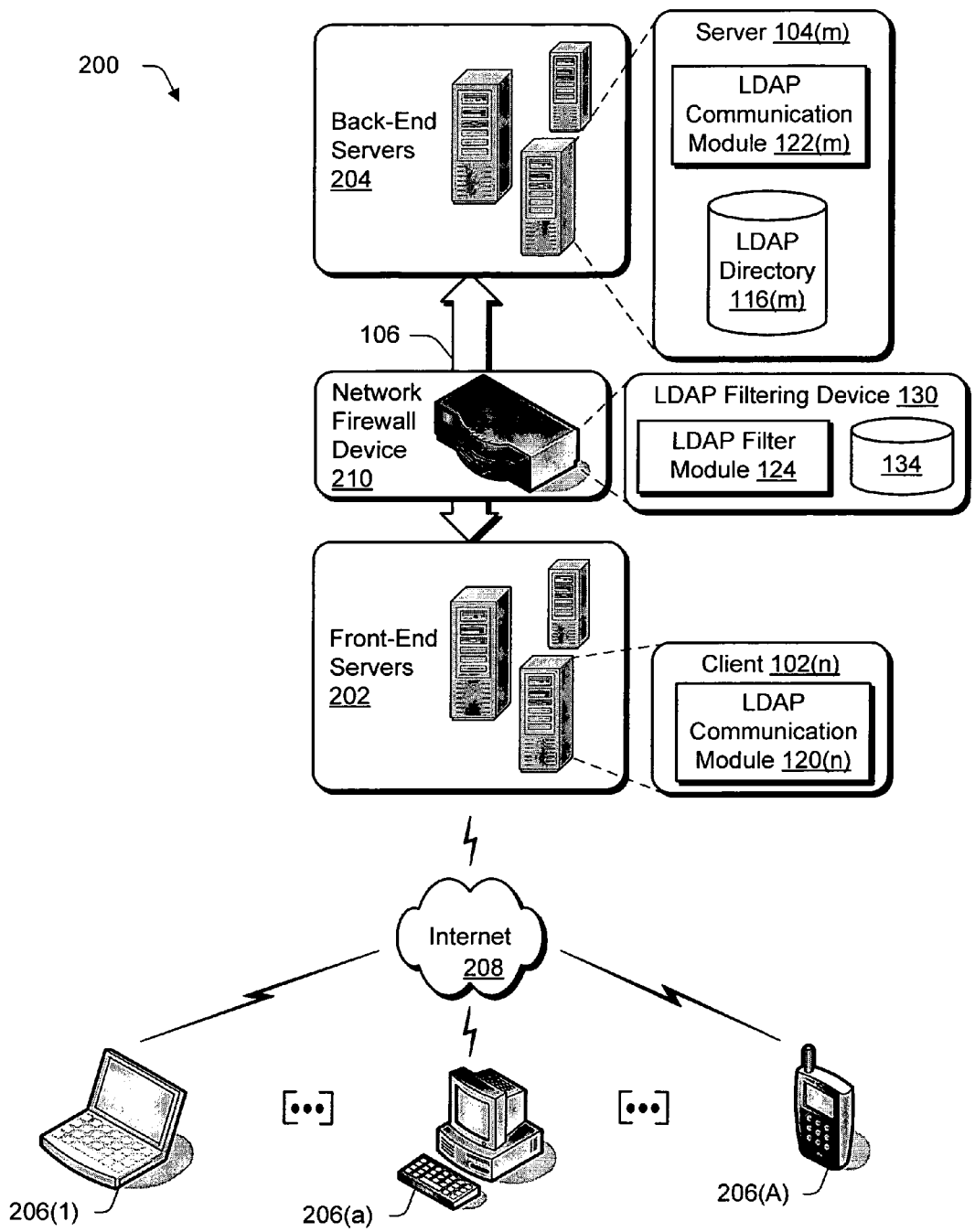
FIG. 2 is an illustration of an environment in which a plurality of clients, a plurality of servers, and an LDAP filtering device of FIG. 1 are implemented within a corporate intranet and are accessible to a plurality of computing devices via the Internet.

FIG. 2 is an illustration of an environment 200 in which the plurality of clients 102(*n*), the plurality of servers 104(*m*), and the LDAP filtering device 130 of FIG. 1 are implemented within a corporate intranet to provide access to a plurality of computing devices via the Internet. In the environment 200 of FIG. 2, a "front-end/back-end" server architecture is shown, which may be utilized to provide a wide variety of functionality, such as e-commerce, remote access to employees, and so on. In this architecture, server tasks are distributed among front-end and back-end servers 202, 204.

The front-end servers 202, for instance, may be configured to accept requests from a plurality of computing devices 206(1), . . . , 206(*a*), . . . , 206(A) from over the Internet 208. The plurality of clients 102(*n*) of FIG. 1 are configured in FIG. 2 as the front-end servers 202 to communicate requests via the network 106 for processing by one or more of the plurality of back-end servers 204. Thus, in the environment of FIG. 2, the front-end servers 202 are "clients" of the back-end servers 204. At least one of the back-end servers 204 is configured as the server 104(*m*) of FIG. 1 and therefore includes the LDAP directory 116(*m*). In an implementation, the LDAP directory 116(*m*) provides data which is requested by the clients 102(*n*) (i.e., the front-end servers 202), such as user account information for e-commerce. In another implementation, the LDAP server 104(*m*) provides data which describes where to locate desired data on a different one of the back-end servers 204. In other words, the LDAP directory 116(*m*) in this implementation "points to" a network address of other back-end servers 204. Thus, the LDAP directory 116(*m*) may be configured such that the clients 102(*n*) may access the LDAP directory 116(*m*) to find a network location of desired data, such as user account information.

To protect the back-end servers 204 from attack due to exposure of the front-end servers 202 to the plurality of computing devices 206(1)-206(A), the LDAP filtering device 130 may be configured as a network firewall device 210. The network firewall device 210 is illustrated as disposed between the front-end and back-end servers 202, 204 on the network 106. The network firewall device 210 executes the LDAP filter module 124 to manage traffic between the servers 202, 204, and therefore to restrict unauthorized access by the computing devices 206(1)-206(A) to the back-end servers 204. For instance, the LDAP filter module 124 may provide filtering of the data communicated utilizing LDAP, authentication of requests and responses, and so forth.

Figure 3:
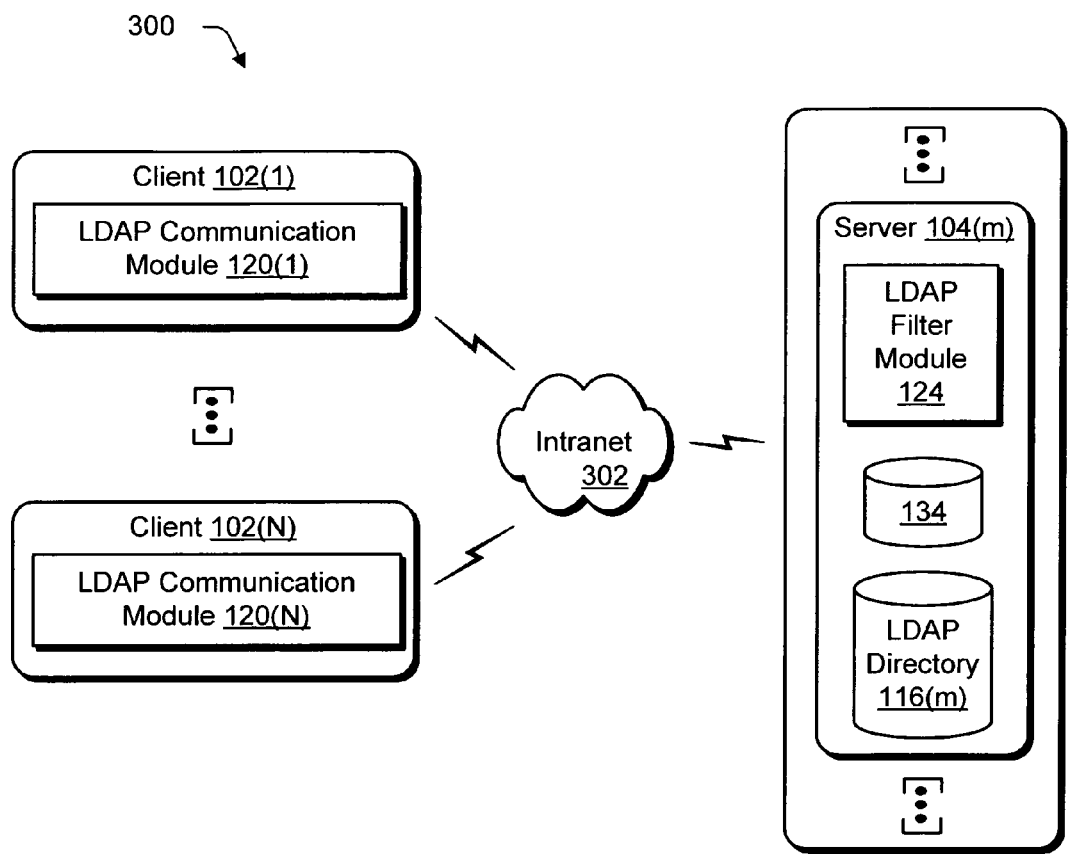
FIG. 3 is an illustration of an environment in which the LDAP filtering device of FIG. 1 is implemented within a corporate intranet as a dedicated server to provide the LDAP directory to the plurality of clients.

FIG. 3 is an illustration of an environment 300 in which the LDAP filtering device 130 of FIG. 1 is implemented within a corporate intranet 302 as a server 304 to provide the LDAP directory 134 to the plurality of clients 102(1)-102(N). In the environment 200 of FIG. 2, the LDAP filtering device 103 was implemented as a "stand-alone" network firewall device. The functionality of the LDAP filter module 124 may also be incorporated within one or more of the plurality of servers 104(m), as shown in FIG. 3. For example, the plurality of clients 102(1)-102(N) may execute the respective LDAP communication modules 120(1)-120(N) to form requests for locating data referenced by the LDAP directory 116(m) implemented by the plurality of servers 104(m). Although exemplary environments 100, 200, 300 have been described in relation to respective FIGS. 1, 2, and 3, a variety of other exemplary environments are also contemplated without departing from the spirit and scope thereof, such as through implementation of the LDAP filtering device 130 of FIG. 1 as a proxy.

Exemplary Procedures

The following discussion describes techniques of managing LDAP traffic that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. It should also be noted that the following exemplary procedures may be implemented in a wide variety of other environments without departing from the spirit and scope thereof.

Figure 4:
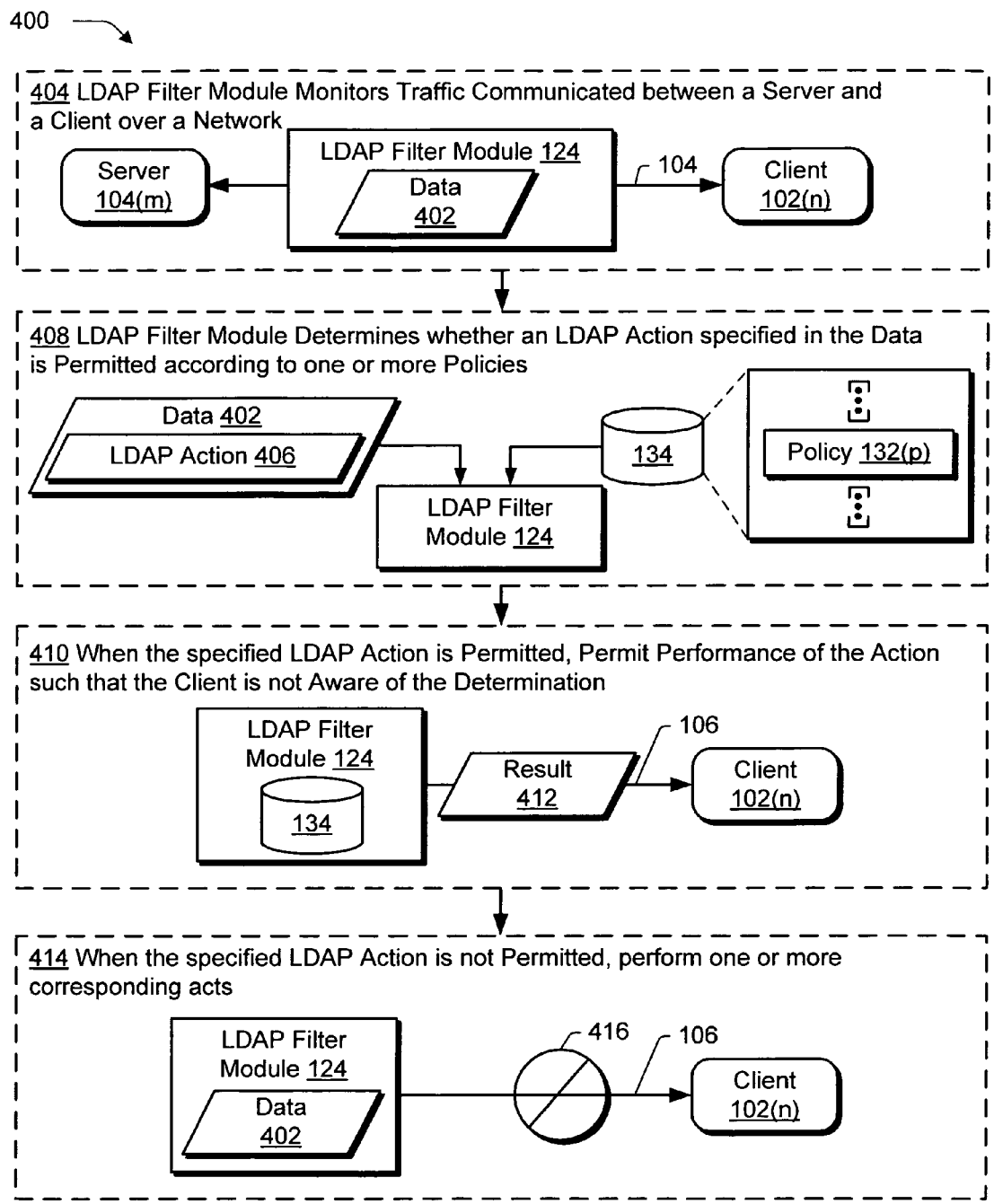
FIG. 4 is a flow diagram depicting a procedure in an exemplary implementation in which the LDAP filter module of FIG. 1 is executed to manage traffic communicated over a network utilizing LDAP between a client and a server.

FIG. 4 is a flow diagram depicting a procedure 400 in an exemplary implementation in which the LDAP filter module 124 of FIG. 1 is executed to manage traffic communicated over a network utilizing LDAP between a client and a server. An LDAP filter module 124 is executed to monitor data 402 communicated between the server 104(m) and the client 102(n) (block 404). For example, the data 402 may be configured as a request for communication from the client 102(n) to the server 104(m) to perform an LDAP action. In another example, the data 402 may be configured as a result of an LDAP action (e.g., a result from the performance of an LDAP operation) performed by the server 104(m) in response to a request originating from the client 102(n).

When executed, the LDAP filter module 124 determines whether an LDAP action 406 specified in the data is permitted according to one or more policies 132(p) (block 408). For example, the LDAP filter module 124 may compare the LDAP action 406 with each of the plurality of policies 132(p) to determine if a request to perform a particular action originating from the client 102(n) is permitted. For instance, one or more of the policies 132(p) may specify that certain operations may only be performed by certain clients. Therefore, the LDAP filter module 124 may determine whether the request was received by such a client, such as a network administrator, a "trusted" user, and so on. Likewise, the data 402 may be a result of the performance of the LDAP action 406. Therefore, the LDAP filter module 124 may be executed to determine if the client 102(n) is authorized to receive such a result.

A variety of other determinations may be made through execution of the LDAP filter module 124. For example, the LDAP filter module 124 may enforce adequate levels of authentication by inspecting an authentication operation sequence and deciding (e.g., according to one of the policies 132(p)) whether a minimum authentication level has been reached. For instance, if the client 102(n) identifies itself as "anonymous" or uses "basic" credentials, the LDAP filter module 124 may reject the authentication for failure to obtain a minimum level of desired authentication. In another example, the LDAP filter module 124 may decide whether to allow signed/sealed LDAP traffic. In a further example, the LDAP filter module 124 may enforce LDAP specification correctness such that a determination is made as to whether the data 402 complies with the LDAP specification. If not, the data may be modified such that it does comply, as further described in relation to FIGS. 5 and 6. It yet another example, the LDAP filter module 124 may protect against known acts on the LDAP directory 116(m), such as null based queries. Additionally, the LDAP filter module 124 may act on both a normal LDAP server port as well as a global catalog. For instance, a global catalog is a Windows domain controller (e.g., LDAP server) that acts as an authoritative object store for an entire domain (e.g., set of LDAP servers). In other words, the domain controller may act as a root of a virtual hierarchical store.

When the specified LDAP action is permitted, performance of the LDAP action 406 is permitted by the LDAP filter module 124 such that the client 102(n) is not aware of the determination (block 410). For example, when the data 402 is configured as a request, the LDAP filter module 124 may forward the request for causing the server 104(m) to perform the specified LDAP action 406. In another example, when the data 402 is configured as a result 412, the LDAP filter may permit communication of the result 412 to the client 102(n) over the network 106 without notifying the client 102(n) of the execution of the LDAP filter module 124 to manage the traffic. Thus, execution of the LDAP filter module 124 may be "transparent" to the client 102(n) and/or the server 104(m).

When the specified LDAP action 406 is not permitted, one or more corresponding acts are performed (block 414). For example, the LDAP filter module 124, upon determining that the LDAP action 406 is not permitted, may terminate 416 the network connection of the client 102(n) with the server 104(m). In another example, the LDAP filter module 124 may modify the data 402 such that the modified data is suitable for completion of the LDAP action. For instance, the LDAP filter module 124 may modify a request such that the LDAP operations specified by the request may be performed, further discussion of which may be found in relation to FIG. 5. In another instance, the LDAP filter module 124 may modify a response such that it includes data which is permitted to be communicated to the client 102(n), further discussion of which may be found in relation to FIG. 6.

Figure 5:
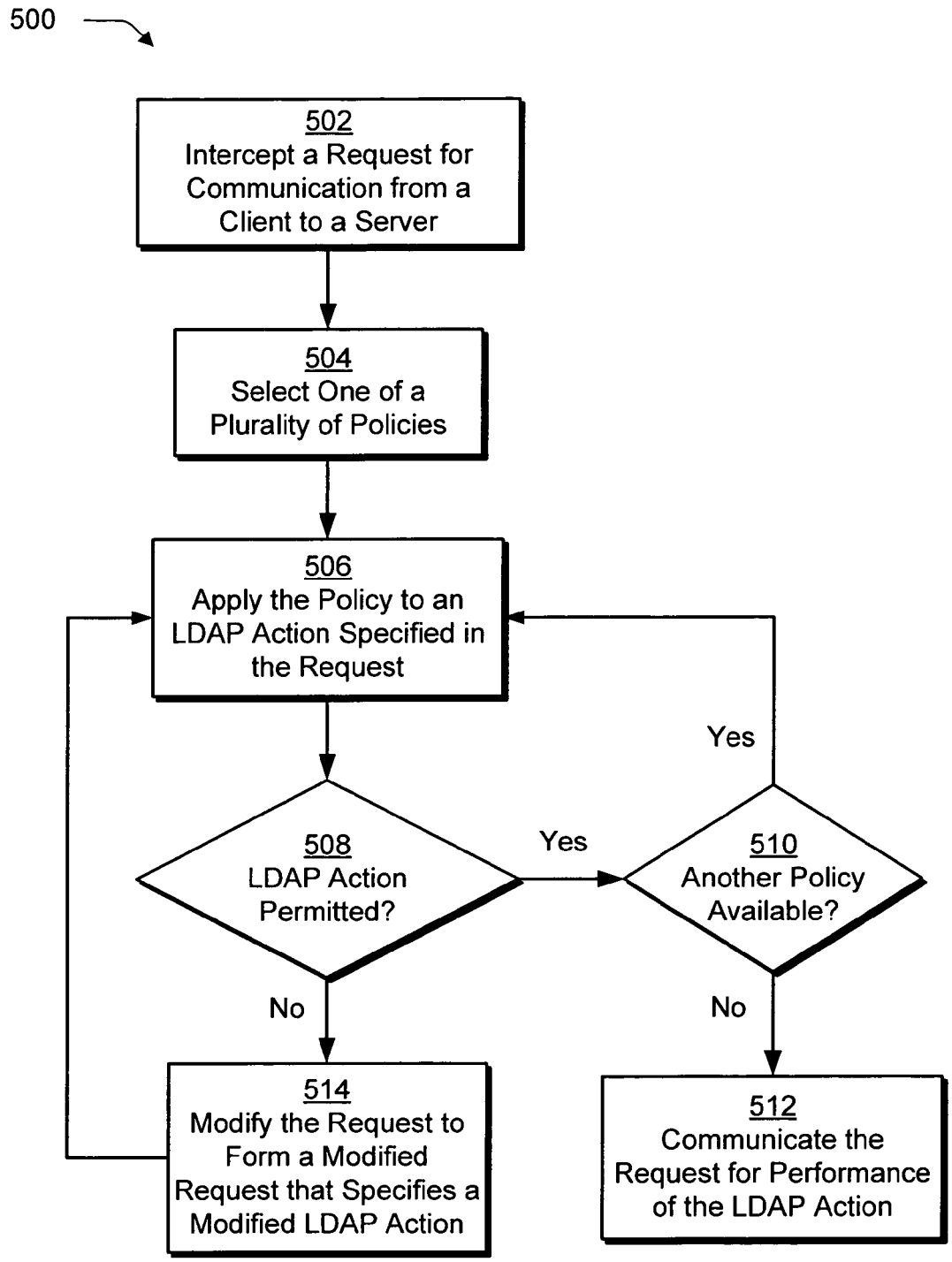
FIG. 5 is a flow diagram depicting a procedure in an exemplary implementation in which a request intercepted by an LDAP filter module for performance of an LDAP action which is not permitted is modified such that the modified LDAP action specified by the request is permitted.

FIG. 5 is a flow diagram depicting a procedure 500 in an exemplary implementation in which a request intercepted by an LDAP filter module for performance of an LDAP action which is not permitted is modified such that the modified LDAP action specified by the request is permitted. A request for communication from a client to a server is intercepted (block 502) by an LDAP filter module. For example, the LDAP filter module may be configured as a network firewall device that is disposed on a network between the client and the server.

In response to the interception, one of a plurality of policies is selected by the LDAP filter module (block 504). The LDAP filter module then applies the policy to an LDAP action specified in the request (block 506) to determine whether the LDAP action is permitted (decision block 508).

If the LDAP action is permitted, the LDAP filter module determines if another policy is available (decision block 510). If so, the policy is applied to the LDAP action as previously described (block 506). This may continue for each policy, for which, the LDAP action is permitted (decision block 508) until another policy is not available (decision block 510). At this point, the request may be communicated for performance of the LDAP action (block 512).

If the LDAP action is not permitted (decision block 508), the request is modified to form a modified request that specifies a modified LDAP action (block 514). For example, the request may specify the performance of a plurality of LDAP operations, one of which being a "modify" operation. The policy, however, may specify that modify operations are not permitted. Therefore, the part of the request specifying the modify operation may be removed, thereby permitting the performance of other LDAP actions specified in the request. In another example, the request may specify a particular LDAP operation and a plurality of objects, on which, to perform the LDAP operation. The policy, however, may specify that the modify operation cannot be performed on one of the specified LDAP objects. Therefore, the modify operation for that particular LDAP object may be removed from the request such that the modified request complies with the policy. In another implementation in which modification of requests/responses is not supported (such as when there is no end-to-end signing of the traffic), the LDAP filter module may still block the request as previously described.

Figure 6:
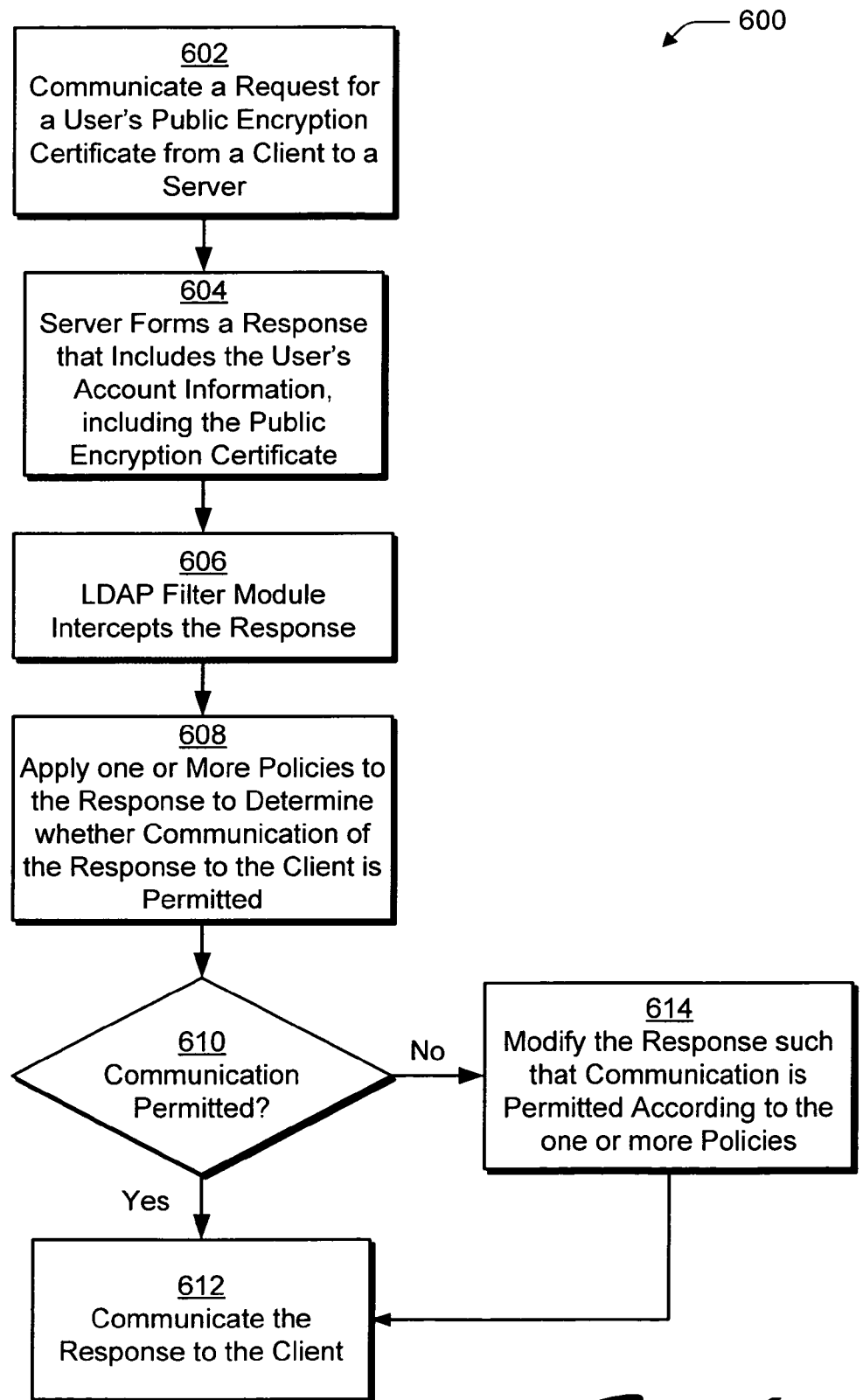
FIG. 6 is a flow diagram depicting a procedure in an exemplary implementation in which a response intercepted by an LDAP filter module resulting from performance of an LDAP action which is not permitted by a policy is modified such that the modified response complies with the policy.

FIG. 6 is a flow diagram depicting a procedure 600 in an exemplary implementation in which a response intercepted by an LDAP filter module resulting from performance of an LDAP action which is not permitted by a policy is modified such that the modified response complies with the policy. First, a request is communicated from a client to a server for a user's public encryption certificate (block 602). Accordingly, the server forms a response that includes the user's account information, which includes the public encryption certificate (block 604).

The LDAP filter module, when executed, intercepts the response from the server (block 606). The LDAP filter module then applies one or more polices to the response (block 608) to determine whether communication of the response to the client is permitted (decision block 610). A policy, for example, may specify that a user's credit information is only to be communicated in response to a request for that information that is signed by a particular certificate. In this example, the communicated request (block 602), however, does not include such a certificate. Accordingly, the response is modified such that communication of the modified response to the client is permitted according to the one or more policies (block 612). Continuing with the previous example, the credit information is stripped from the response to form the modified response having just the public encryption certificate, which therefore complies with the policy. Accordingly, the response may be communicated to the client (block 614). Although a variety of techniques have been described for modifying requests and responses, a variety of other techniques are also contemplated without departing from the spirit and scope thereof.

Figure 7:
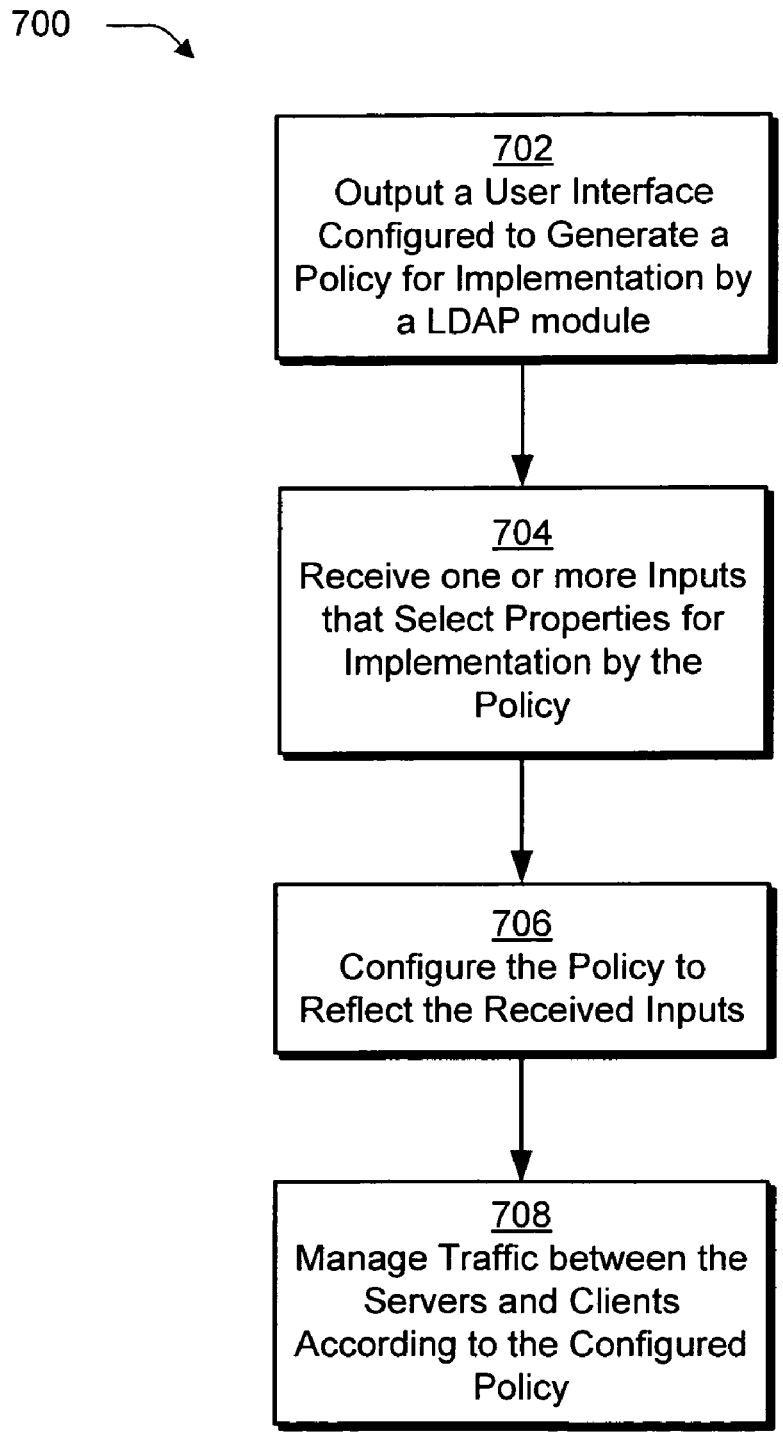
FIG. 7 is a flow diagram depicting a procedure in an exemplary implementation in which a user designs a policy via a user interface by selecting one or more properties for inclusion in the policy via a user interface.

FIG. 7 is a flow diagram depicting a procedure 700 in an exemplary implementation in which a user designs a policy via a user interface by selecting one or more properties for inclusion in the policy via a user interface. The LDAP filter module 124 of FIG. 1 is executed to output a user interface configured to generate a policy for implementation by the LDAP filter module (block 702). For example, a network administrator (hereinafter "administrator") may interact with the user interface to configure a policy.

Accordingly, the LDAP filter module may receive one or more inputs from the administrator to select properties for implementation by the policy (block 704). For example, the administrator may specify which actions can and cannot be performed according to the policy, such as particular LDAP operations, particular LDAP objects, LDAP operations and objects, and so on. In response to the inputs, the LDAP filter module configures the policy to reflect the received inputs (block 706). The configured policy may then be utilized by the LDAP filter module to manage traffic between servers and clients accordingly (block 708). A variety of user interfaces may be output by the LDAP filter module 124 for configuring a policy, examples of which are described in the following section.

LDAP Policy Configuration

Figure 8:
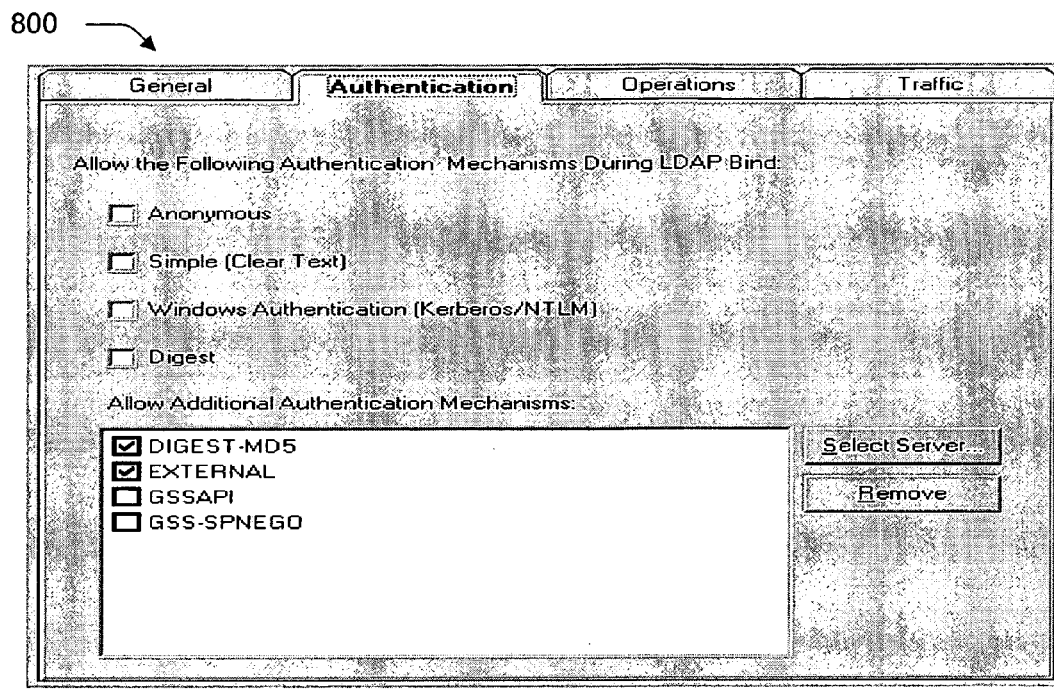
FIGS. 8-10 are illustrations of pages of an exemplary user interface which may be output through execution of the LDAP filter module of FIG. 1 to configure a policy.

FIGS. 8 through 20 are illustrations showing exemplary implementations of user interfaces that may be output by the LDAP filter module 124 of FIGS. 1 through 7. The user interfaces may provide a variety of techniques for selection of properties by a user for configuration of a policy, such as to select which LDAP actions are permissible or impermissible. For example, the user interfaces may provide a plurality of descriptions of LDAP functionality which may be selected by a user to cause a policy to be configured accordingly. As shown in FIG. 8, for instance, a user interface may include an "authentication" page 800 which describes a plurality of authentication mechanisms that may be employed during an LDAP bind operation. The user may select one or more of the authentication mechanisms by "checking" a corresponding box with a cursor control device (e.g., a mouse). Therefore, a corresponding policy may be configured based on which of the authentication mechanisms were selected by the user.

Figure 9:
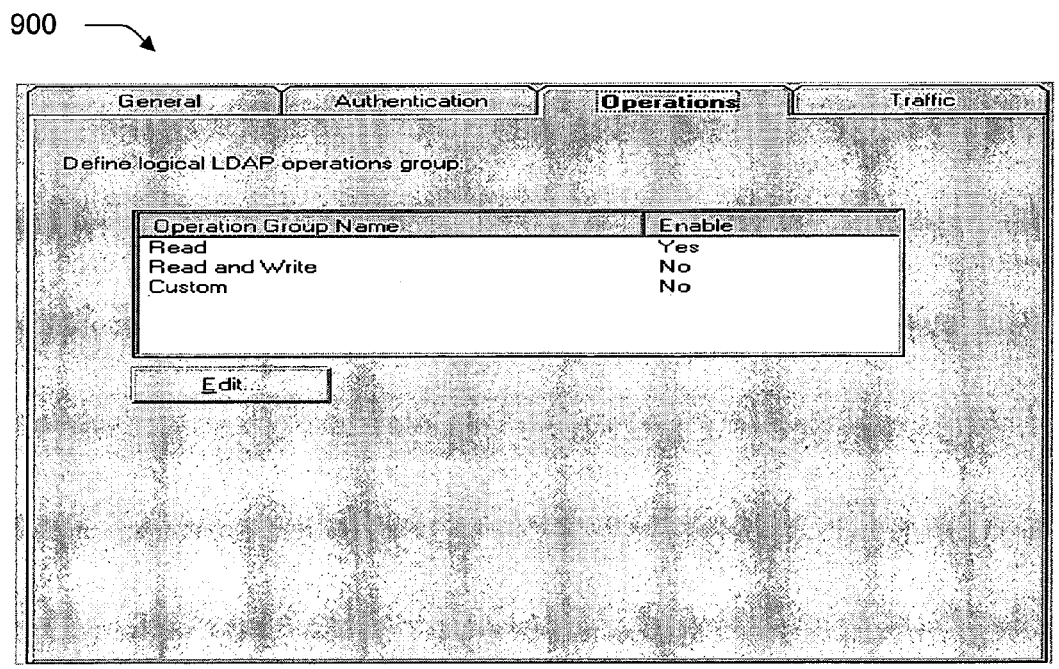
Figure 10:
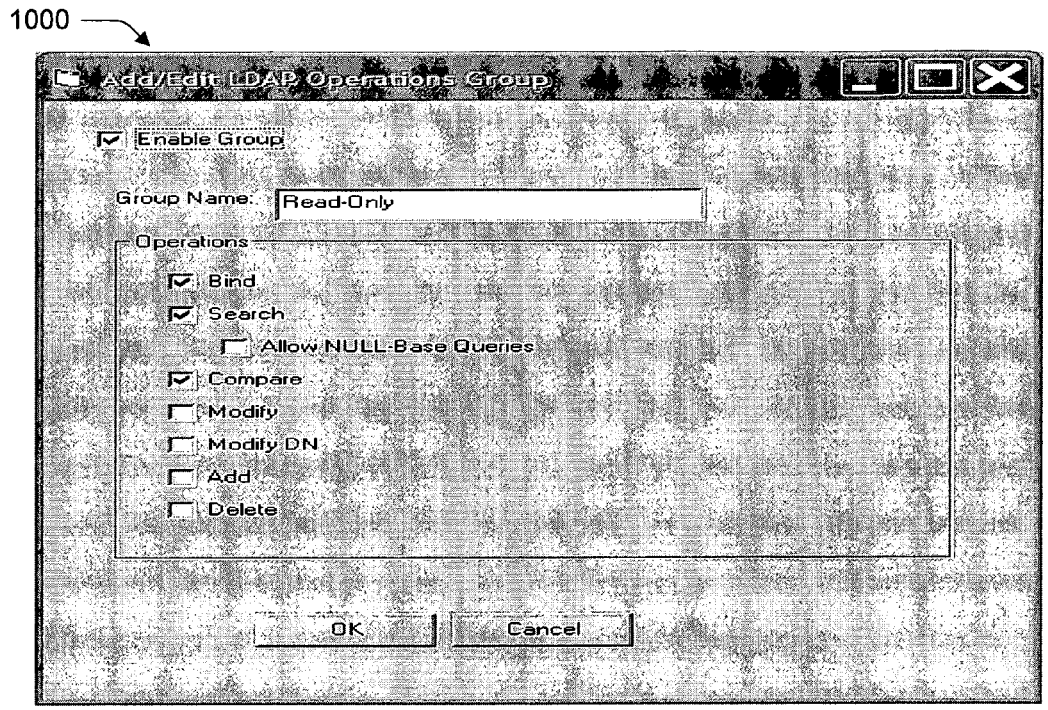

FIG. 9 is an illustration of a user interface showing an "operations" page 900. The operations page 900 displays logical groupings of logical LDAP which may be defined. Additionally, by selecting the "edit" button, the user may select particular LDAP operations, as shown in a "selection" page 1000 of the user interface of FIG. 10. The selection page 1000 also include a plurality of check boxes, but in this instance, each box is for selection of a particular LDAP operation, which are illustrated in FIG. 10 as "bind", "search" (which is illustrated as having a nested selection titled "allow NULL based queries"), "compare", "modify", "modify DN", "add" and "delete".

Figure 11:
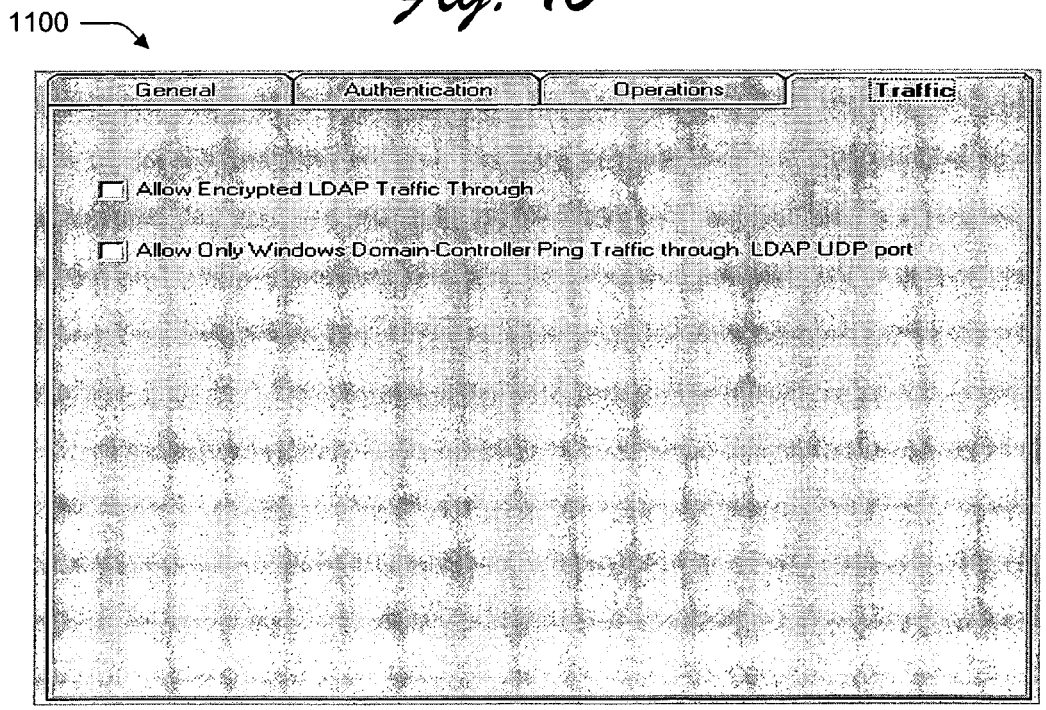
FIGS. 11-20 are illustrations of pages and dialog boxes of another exemplary user interface which may be output through execution of the LDAP filter module of FIG. 1 to configure a policy.

The user interface may also include a "traffic" page 1100, as shown in FIG. 11, for selection of additional LDAP actions, such as whether to allow encrypted LDAP traffic through the LDAP filter module, whether to allow an LDAP locator ping (i.e., "ping" traffic, such as by utilizing an arbitrary command for detection of an LDAP server by a client), and so on. Thus, the user may select one or more of the pages 800, 900, 1000, 1100 illustrated in FIGS. 8-11 to configure policies for implementation by the LDAP filter module to manage traffic.

Figure 12:
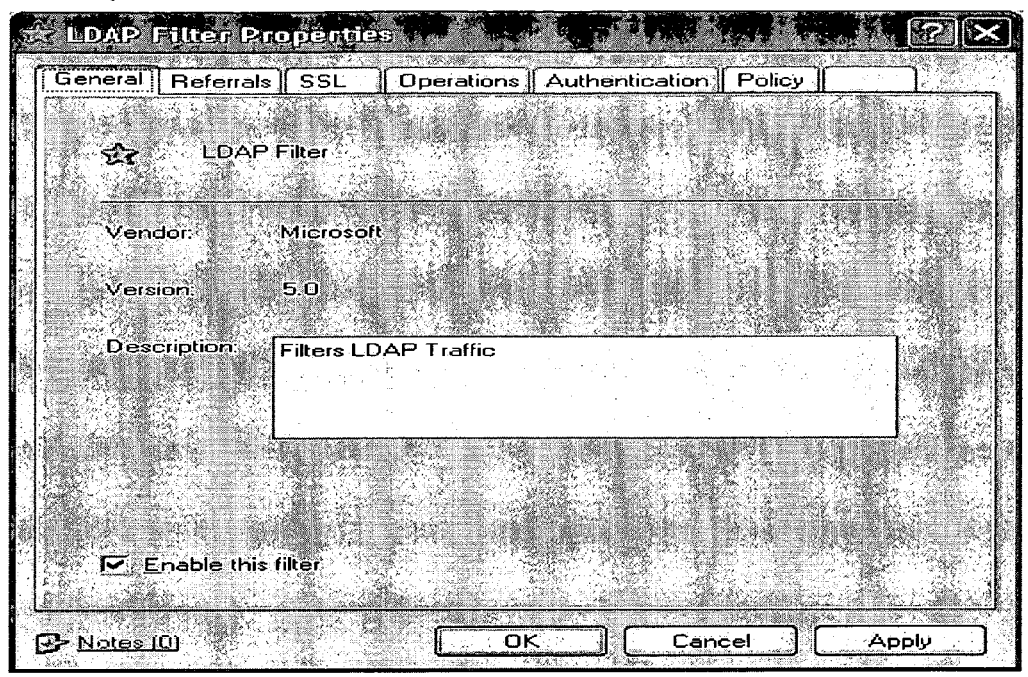

FIGS. 12-20 illustrate another exemplary implementation of a user interface which may be output by the LDAP filter module 124 to configure a policy. FIG. 12 is an illustration showing a "general" page 1200 of the user interface which describes the LDAP filter module and enables a user to enable/disable the LDAP filter module.

Figure 13:
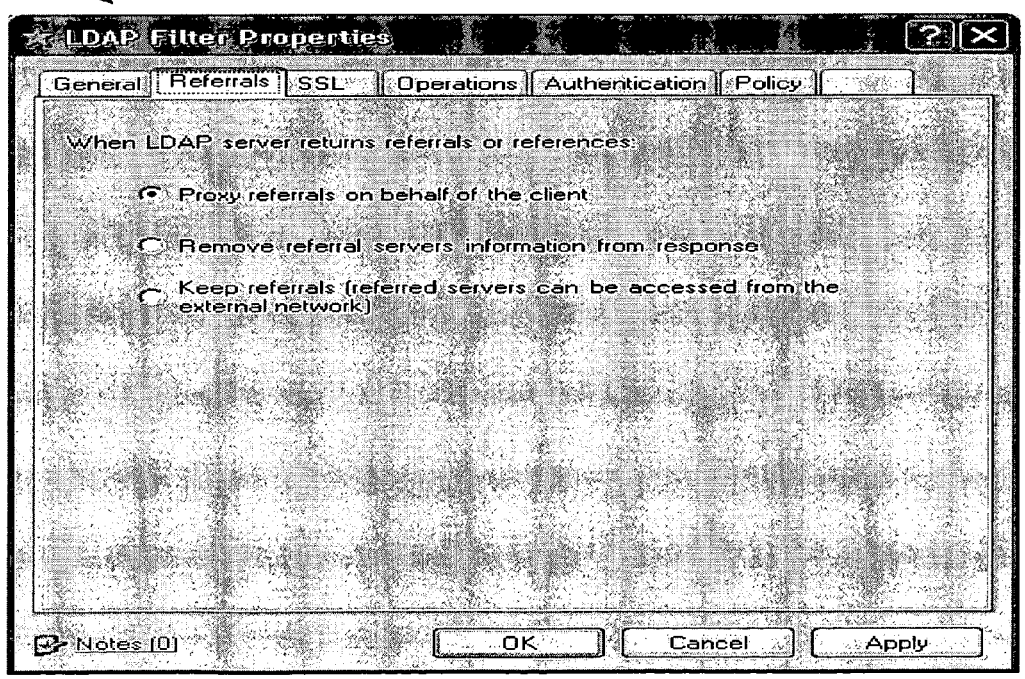

A referrals page 1300 of the user interface is shown in FIG. 13. Referrals may pose both administration issues and potential security risks to an LDAP directory. For example, a referral may be used to expose server names which may not be accessible externally, may allow an attacker to learn more about the internal directory resources from internal Internet protocol (IP) addresses or names, and so on. To address these possible security risks, the referrals page 1300 may provide a variety of options which are selectable by a user to control referral information in a response.

A "proxy" selection, for instance, may be provided such that the LDAP filtering device functions as an LDAP client in case of referral error, and re-queries the correct directory server for the relevant object. This may result, however, in additional references or referrals in the resulting response. Therefore, the final response returned to the external client may be configured such that it does not include referral information.

A "remove referrals" selection may be provided to cause the removal of referrals from the response such that internal server information is not exposed. In the case of a referral error, information indicating the occurrence of the error may be returned to the client without including other descriptive information. In other words, in an implementation, the information returned to the client describes just the referral error. In addition, all reference information included in a result of an LDAP search operation response may be filtered from the response. In another implementation, an error may be returned without such filtering. For instance, this approach may be useful for an administrator that deliberately does not allow referrals in the response by design.

A "keep referrals" selection may also be provided so that the client can rebind and re-query the referenced (i.e., "referred to") directory server. For instance, this approach may be desired in instances where the referrals correspond to externally available servers.

Figure 14:
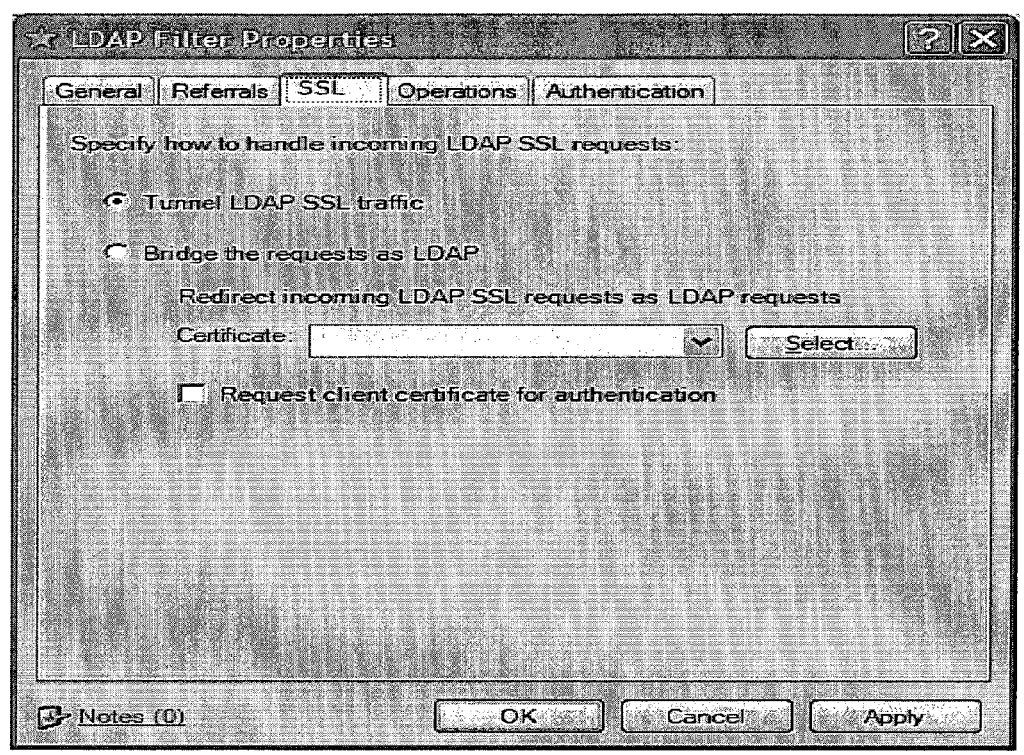

The user interface may also provide a secure sockets layer (SSL) page 1400 as shown in FIG. 14 for configuring how the LDAP filter module addresses LDAP over SSL traffic. For instance, the SSL page 1400 may include a "tunnel" option such that the LDAP filter module will not modify the incoming and outgoing SSL traffic.

The SSL page 1400 may also include a "bridging option". Similar to web proxy hyper text transfer protocol secure sockets (HTTPS) support, the LDAP filter module may expose a server certificate associated with secure LDAP (hereinafter "LDAPS") traffic. In this case the LDAP filter module will be an endpoint for incoming LDAP SSL traffic. Once decrypted, the traffic may be checked for validity and access control, and then passed on, such as a regular LDAP request. In addition, the LDAP module may also provide an option for authenticating the client certificate.

FIG. 14 is an illustration of an "operations" page 1400 which may be provided by the user interface of the LDAP filter module 124. For instance, the LDAP filter module, when executed, may inspect a request LDAP operation against a policy configured according to this operations page 1400.

The operations page 1400 is divided into three logical groups, each one defining an allow/deny state for each of the defined LDAP operations. In an implementation, the administrator cannot add new groups or delete any of the pre-existing ones. However, the administrator can edit the content of the "custom" group. The other two logical groups' contents (illustrated as "read" and "read and write") can be browsed after selecting "edit", but cannot be changed because of fixed semantics. The read group describes LDAP operations with read semantics (e.g., search and compare). In an implementation, extended operations are allowed by the read group.

The operations page 1400 is also illustrated as including two check boxes which are labeled "allow LDAP v2 operations" and "allow clients to send controls". In some instances, the LDAP implementation is version dependent. For example, a system may be configured such that only version two of the protocol is supported, while another implementations may support version three. Version two is generally considered less-secure (e.g., it does not support SASL as bind authentication mechanism and allows only simple authentication). Accordingly, the administrator may block version two operations through use of the check box. Regarding the "allow controls" selection, clients may send controls as part of each command. These controls may serve as either cookies (e.g., to manage bind state in case it requires multiple calls) or allow extension of the server implementation for specific operations. Accordingly, the "allow LDAP v2 operations" and "allow clients to send controls" enable the administrator to turn-off the controls feature altogether or allow the administrator to define which particular controls are allowed by a policy.

Figure 15:
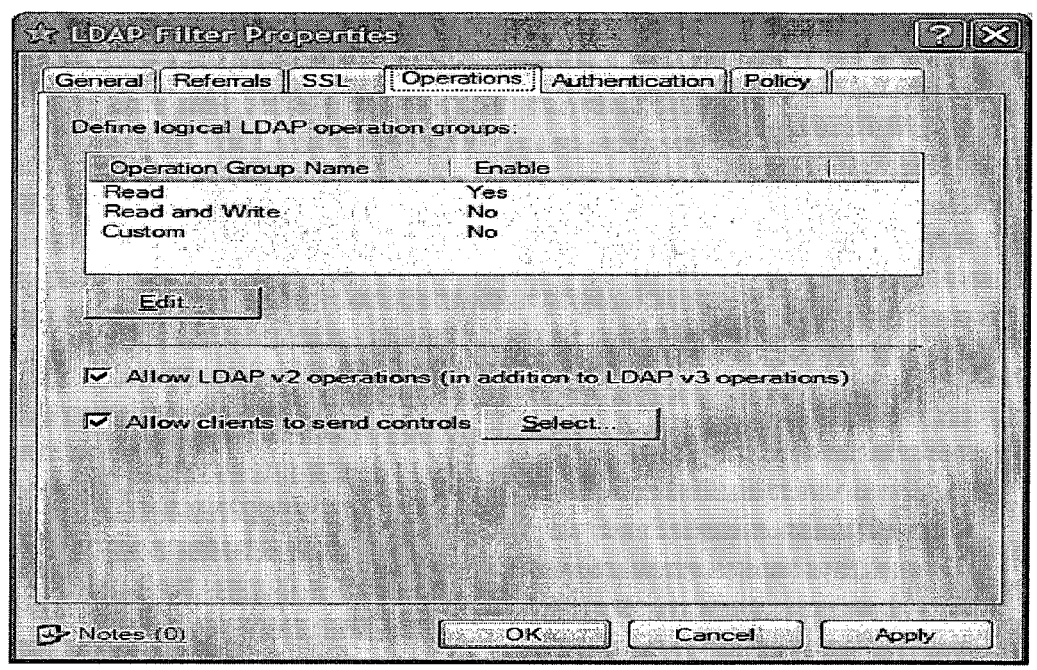
Figure 16:
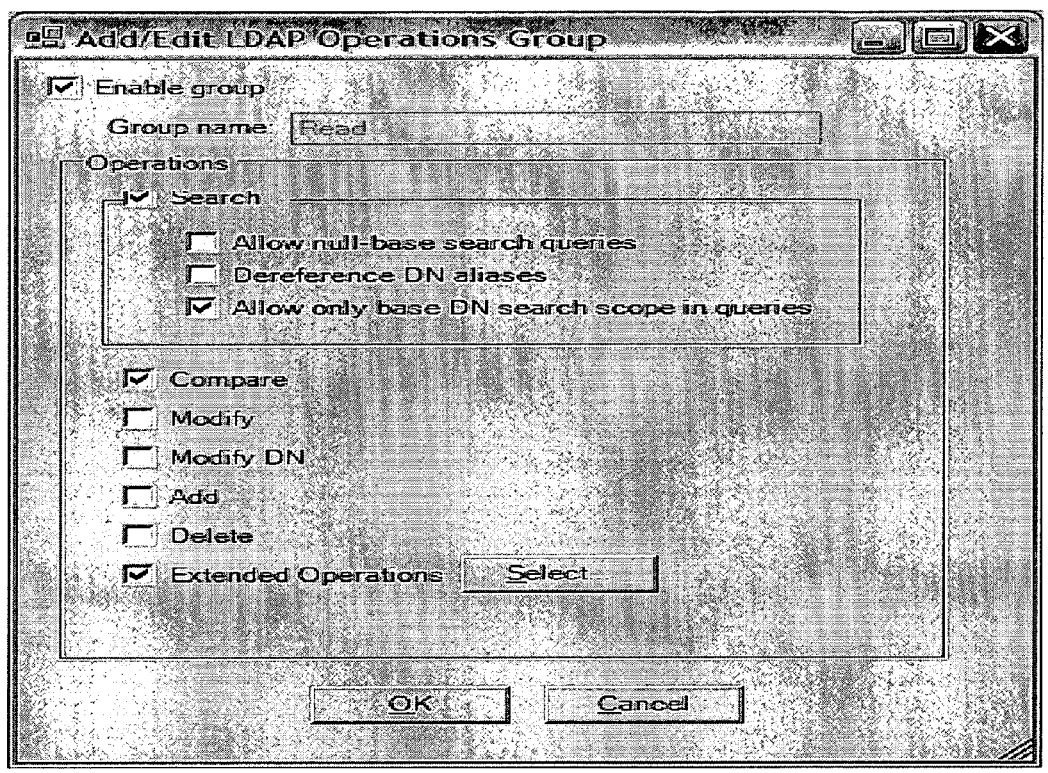
Figure 17:
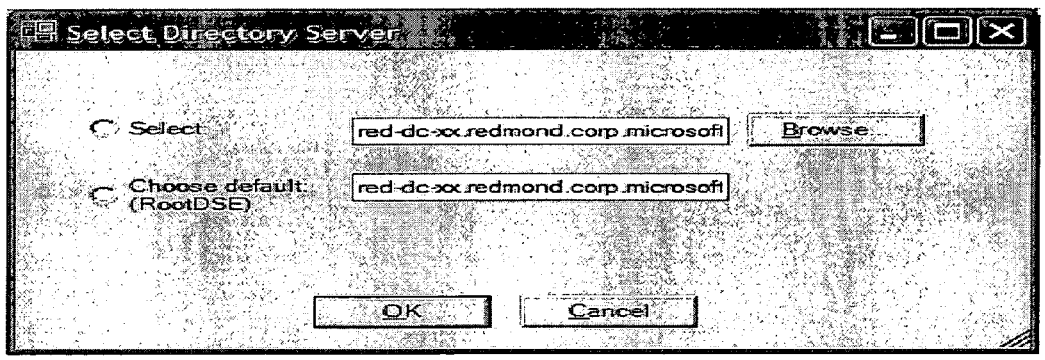

Selection of the "edit" button illustrated in the operations page 1500 of FIG. 15 causes output of a dialog box 1600 of FIG. 16. This dialog box 1600, for custom groupings, allows selection (e.g., checking) and deselection (e.g., un-checking) to allow and deny permission to perform the corresponding LDAP operation. In addition, the group can be either enabled or disabled as whole.

The search operation allows further configuration of security related properties, examples of which are illustrated as "null-base queries", "dereference aliases", and "allow only base DN search scope in queries". For instance, LDAP allows objects to be defined as aliases to point to another object(s). These aliases, however, may be dangerous in scenarios in which the administrator mistakenly points such objects to internal objects that not well protected by an active control list (ACL). Accordingly, this property may be configured such that dereference alias objects are not allowed in search operations. The "allow only base DN search scope in queries", when checked, specifies that search LDAP operations cannot use wild-cards to access objects in addition to the specified base DN, such as by defining a scope in a search request that is larger than a single DN. For instance, this may be utilized to protect an organization's directory information tree (DIT) from wild-card searches which may expose sensitive collections of objects, such as a user list, credit information, and so on.

Extended operations may also be "enabled" or "disabled" through the dialog box 1600. For example, LDAP may allow additional operations to be added to specific LDAP implementations. An extended operation, for instance, may be identified by a unique object identifier (OID). The "extended operations" in the dialog box 1600 are illustrated as having a corresponding "select" button, that when selected, causes an output of the dialog box 1700 of FIG. 17. This dialog box 1700 provides the administrator with the ability to manually add/remove operations according to the OID, select a directory server and read the extended operation list via a specific property, and manage unsolicited events sent from the server to the clients.

Figure 18:
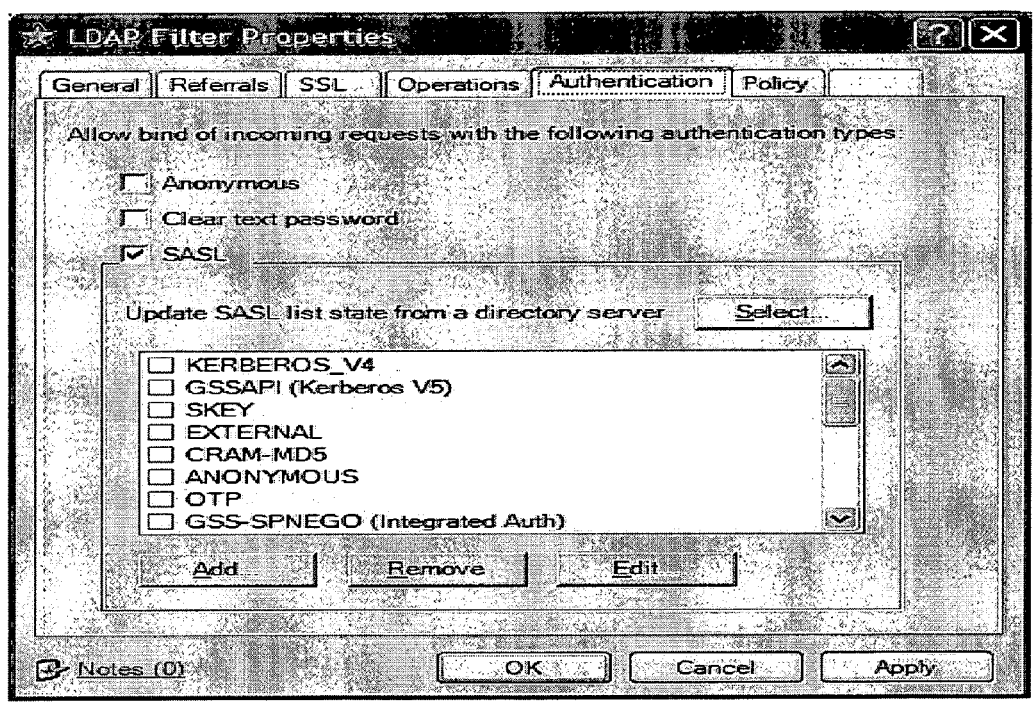

FIG. 18 is an illustration of an "authentication" page 1800 which may be output as a user interface of the LDAP filter module 124. The authentication page 1800 is configured to allow the administrator to select a "level" of authentication allowed by the LDAP filter module in client bind requests. If the client's bind requests do not contain the appropriate level of authentication, for instance, the LDAP filter module may reject the request without passing it on to an LDAP server (i.e., a server which provides access to an LDAP directory). For example, the administrator may not allow anonymous requests (e.g., a bind request with NULL password), may not allow LDAP operations to be performed without completing a "bind" operation first, and so on.

The authentication page 1800 illustrates a plurality of authentication mechanisms for selection by a user. As illustrated, authentication mechanisms can also be added or removed. The illustrated "select" button of the authentication page 1800 allows the administrator to choose a directory sever, from which, supported SASL mechanisms will be enumerated. If the enumeration results in new mechanisms which are not listed, those authorization mechanisms may be added to the authentication page 1800 for selection by the administrator.

In an implementation, the LDAP filer module 124 may be executed on the LDAP filtering device 130 to act as the actual authenticator, and thereby behave as an LDAP server in this sense and carry out the authentication of the clients. In this implementation, a set of user security identifiers (SIDs) are defined which are considered as allowed for LDAP directory access. The LDAP filtering device 130 (such as when configured as the network firewall device 210 of FIG. 2) may carry out the authentication and compare the authenticated user access token against the listing of allowed users. If the comparison succeeds, the request may be communicated for further processing.

Figure 19:
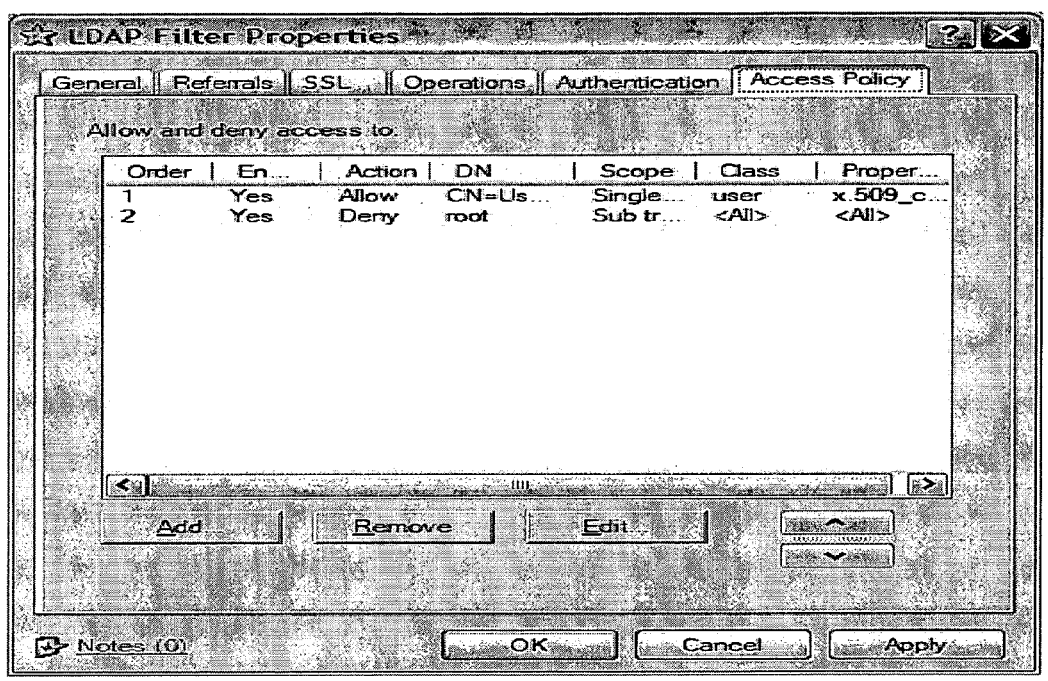

FIG. 19 is an illustration of an "access control" page 1900 which may be output as part of the user interface for the LDAP filter module 124. The access control page 1900 may be utilized to control access to specific DNS, regardless of the corresponding LDAP operation, in specific context and/or when asking for specific properties. For instance, the access control page 1900 may define a simple and global access policy (i.e., unrelated to user sets or IPs) which is composed of LDAP access rules. Each access rule, for instance, may allow/deny access based on:

1) a base DN;
2) the access scope, to which, the rule applies (e.g., a base DN, direct children list, each object in a sub-tree, and so on); and
3) the requested property list.

The rules may be ordered such that the "first match" wins. If none of the rules match the search operation, the access may be denied by default.

Rules can be reordered via the illustrated up and down arrows in the access policy page 1900 of FIG. 19. To further illustrate use of "access scope" field, consider the following examples. In a first example, the base DN is equal to "CN=users, DN=some_corp, DN=com". The access scope is set to "single level" and the requested property list is set to properties "P1", "P2" of class "X". This means that this rule applies to all direct objects under the base DN having properties P1 and P2. Any request outside the range of the direct objects of the DN or to different properties is not relevant to the rule. In a second example, the base DN is equal to "root". The access scope is set as "subtree" and the requested property list is set to "all properties" (and all classes). This means that any access to the directory is either always allowed or denied. In a scenario in which specific properties are allowed for the search, each other property may be truncated from the response. For example, the LDAP filter module may edit the response before returning it back to the client as previously described in relation to FIG. 6.

Figure 20:
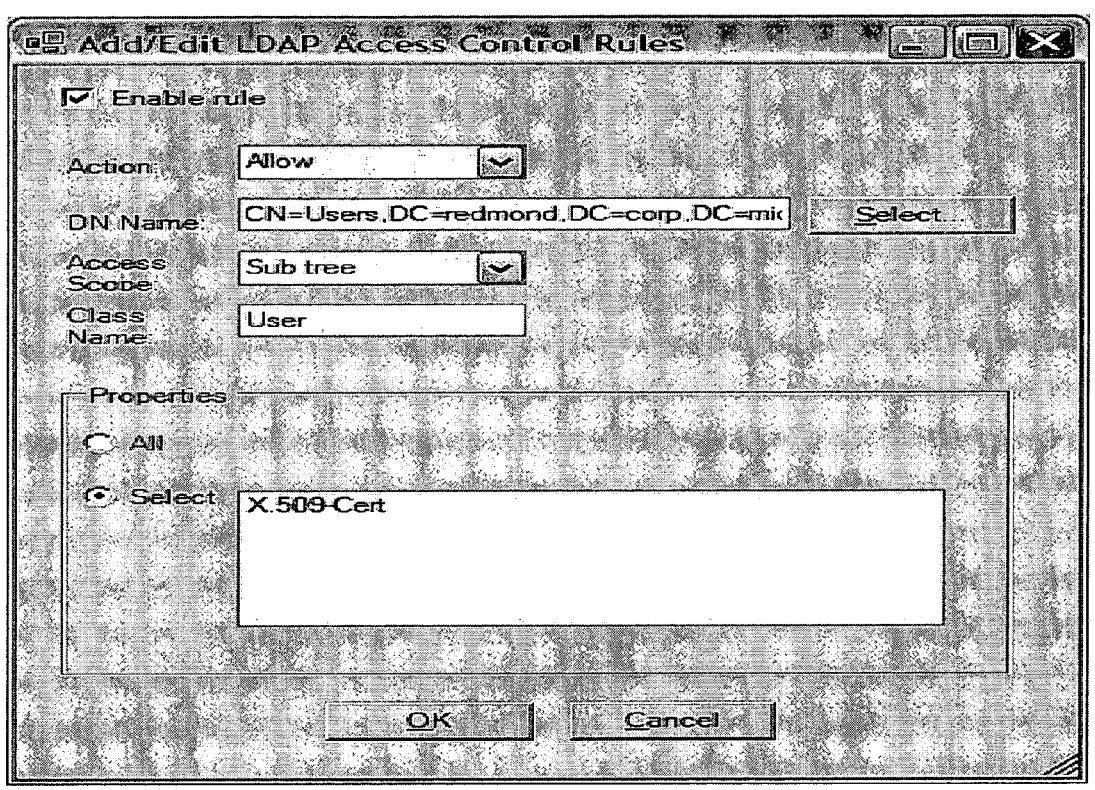

Upon selection of the "edit" button in the access policy page 1900 of FIG. 19, a dialog box 2000 is displayed, an example of which is shown in FIG. 20. The dialog box 2000 of FIG. 20 enables the administrator to specify application of the rule to a particular action, specify a DN name, set an access scope and class name, and select which properties, if any, are applicable to the rule. Although exemplary user interfaces have been described, it should be apparent that the user interfaces may be configured in a variety of ways to provide for configuration of policies for implementation by an LDAP filter module.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   exposing a user interface suitable for receiving inputs from a user that specify whether execution of a particular lightweight directory access protocol (LDAP) action is permitted, wherein the exposing of the user interface includes a plurality of descriptions that are selectable by a user;
   configuring a policy, based on the inputs, for managing lightweight directory access protocol (LDAP) traffic on a network;
   intercepting a request communicated from a client to a server, wherein the request indicates an LDAP action;
   applying the policy to the LDAP action in order to determine whether the LDAP action is permitted, wherein the policy is selected from one or more available policies; and
   in an event the LDAP action is permitted:
      determining if another policy of the one or more policies is available and applying the other policy to the LDAP action if it is available;
      continuing to determine if another policy of the one or more policies is available and applying the other policy to the LDAP action if it is available until there are no more policies available; and
      communicating the request for performance of the LDAP action;
   in an event the LDAP action is not permitted:
      modifying the request to specify a modified LDAP action;
      selecting at least one of the one or more policies;
      applying the at least one of the one or more policies to the modified LDAP action;
      determining if another policy of the one or more policies is available and applying the other policy to the modified LDAP action if it is available; and
      continuing to determine if another policy of the one or more policies is available and applying the other policy to the modified LDAP action if it is available until there are no more policies available; and
      communicating the request for performance of the modified LDAP action.

2. A method as described in claim 1, wherein the lightweight directory access protocol (LDAP) action specifies a particular LDAP operation.

3. A method as described in claim 2, wherein the particular lightweight directory access protocol (LDAP) operation is selected from the group consisting of:
   search;
   compare;
   add;
   delete;
   modify;
   rename
   bind;

unbind; and abandon.

4. A method as described in claim 1, wherein the lightweight directory access protocol (LDAP) action specifies a particular lightweight directory access protocol (LDAP) operation that is not permitted to be performed on a particular LDAP object.

5. A method as described in claim 1, wherein:

one or more of the plurality of descriptions describe a plurality of authentication mechanisms that are selectable for authenticating a client in accordance with at least one of a plurality of authentication levels.

6. A method as described in claim 1, wherein:

one or more of the plurality of descriptions describe a plurality of authentication mechanisms that are selectable by the user for being employed during a lightweight directory access protocol (LDAP) bind operation.

7. A method as described in claim 1, wherein:

one or more of the plurality of descriptions describe logical lightweight directory access protocol (LDAP) operation groups which may be defined through selection by the user.

8. A method as described in claim 1, wherein:

one description is selectable to allow encrypted LDAP traffic; and another description is selectable to allow only ping traffic through a particular LDAP port.

9. A method as described in claim 1, wherein:

at least one description is selectable to control referral information included in a response formed utilizing a lightweight directory access protocol (LDAP) directory.

10. A method as described in claim 1, wherein:

at least one description is selectable to control secure sockets layer (SSL) traffic.

11. A method as described in claim 1, wherein:

at least one description is selectable to control which version of a lightweight directory access protocol (LDAP) is permitted.

12. A method as described in claim 1, wherein:

at least one description is selectable to control access to a particular lightweight directory access protocol (LDAP) object.

13. One or more computer readable storage media having computer executable instructions embodied thereon, the computer executable instructions when executed by a computer, configure the computer to perform the method of claim 1.

14. One or more computer readable media comprising computer executable instructions that, when executed on a computer, direct the computer to perform a method, the method comprising:

outputting a user interface for configuring one or more of a plurality of policies for managing lightweight directory access protocol (LDAP) traffic on a network, wherein the user interface, when output, is configured to enable a user to indicate whether performance of an LDAP operation is permitted and to indicate whether performance of a particular LDAP operation on a particular LDAP object is permitted, by presenting a plurality of descriptions that are selectable by the user;

configuring one or more policies according to one or more descriptions that are selected by the user;

intercepting a request communicated from a client to a server, wherein the request indicates an LDAP operation;

selecting at least one of the one or more policies;

applying the at least one of the one or more policies to the LDAP operation in order to determine whether the LDAP operation is permitted; and in an event the LDAP operation is permitted:

determining if another policy of the one or more polices is available and applying the other policy to the LDAP operation if it is available;

continuing to determine if another policy of the one or more policies is available and applying the other policy to the LDAP operation if it is available until there are no more policies available; and communicating the request for performance of the LDAP operation; in an event the LDAP operation is not permitted:

modifying the request to specify a modified LDAP operation;

selecting at least one of the one or more policies;

applying the at least one of the one or more policies to the modified LDAP operation;

determining if another policy of the one or more polices is available and applying the other policy to the modified LDAP operation if it is available; and continuing to determine if another policy of the one or more policies is available and applying the other policy to the modified LDAP operation if it is available until there are no more policies available; and communicating the request for performance of the modified LDAP operation.

15. One or more computer readable media as described in claim 14, wherein the lightweight directory access protocol (LDAP) operation is selected from the group consisting of:

search;

compare;

add;

delete;

modify;

rename bind;

unbind; and abandon.

16. A system comprising:

a processor;

a memory coupled to the processor, the memory having computer-executable instructions embodied thereon, the computer-executable instructions, when executed by the processor, configuring a computer to secure network traffic;

one or more modules stored on the memory, the one or more modules comprising:

first computer-executable instructions configured to output a user interface having a plurality of descriptions, the plurality of descriptions selectable by a user to configure a policy defining permissible traffic over a network utilizing a lightweight directory access protocol (LDAP);

second computer-executable instructions configured to manage LDAP traffic according to the configured policy; and third computer-executable instructions configuring the system to perform actions comprising:

intercepting a request communicated from a client to a server, wherein the request indicates an LDAP operation;

selecting at least one of one or more policies available;

applying the at least one of the one or more policies to the LDAP operation in order to determine whether the LDAP operation is permitted; and in an event the LDAP operation is permitted:
determining if another policy of the one or more polices is available and applying the other policy to the LDAP operation if it is available;
continuing to determine if another policy of the one or more policies is available and applying the other policy to the LDAP operation if it is available until there are no more policies available; and
communicating the request for performance of the LDAP operation;

in an event the LDAP operation is not permitted:
modifying the request to specify a modified LDAP operation;
selecting at least one of the one or more policies available;
applying the at least one of the one or more policies to the modified LDAP operation;
determining if another policy of the one or more polices is available and applying the other policy to the modified LDAP operation if it is available;
continuing to determine if another policy of the one or more policies is available and applying the other policy to the modified LDAP operation if it is available until there are no more policies available; and
communicating the request for performance of the modified LDAP operation.

17. A system as described in claim 16, wherein the second computer-executable instructions are executable on a network firewall device.

18. A system as described in claim 16, wherein the second computer-executable instructions are executable on a lightweight directory access protocol (LDAP) server.

19. A system as described in claim 16 wherein the user interface is configured to allow a user to specify whether performance of a particular lightweight directory access protocol (LDAP) operation is permitted.

20. A system as described in claim 16, wherein the user interface is configured to allow a user to specify whether interaction with a particular lightweight directory access protocol (LDAP) object is permitted.

21. A system as described in claim 16, wherein the user interface is configured to allow a user to specify whether a particular lightweight directory access protocol (LDAP) operation is permitted to be performed on a particular LDAP object.

22. A system as described in claim 16, wherein the particular lightweight directory access protocol (LDAP) operation is selected from the group consisting of:
search;
compare;
add;
delete;
modify;
rename
bind;
unbind; and
abandon.

23. A system as described in claim 16, wherein one or more of the plurality of descriptions describe a plurality of authentication mechanisms that are selectable for authenticating a client in accordance with at least one of a plurality of authentication levels.

24. A system as described in claim 16, wherein one or more of the plurality of descriptions describe a plurality of authentication mechanisms that are selectable by the user for being employed during a lightweight directory access protocol (LDAP) bind operation.

25. A system as described in claim 16, wherein one or more of the plurality of descriptions describe logical lightweight directory access protocol (LDAP) operation groups which may be defined through selection by the user.

26. A system as described in claim 16, wherein:
one description is selectable to allow encrypted LDAP traffic; and
another description is selectable to allow only ping traffic through a particular LDAP port.

27. A system as described in claim 16, wherein at least one description is selectable to control referral information included in a response formed utilizing a lightweight directory access protocol (LDAP) directory.

28. A system as described in claim 16, wherein at least one description is selectable to control secure sockets layer (SSL) traffic.

29. A system as described in claim 16, wherein at least one description is selectable to control which version of a lightweight directory access protocol (LDAP) is permitted.

* * * * *